United States Patent
Choi et al.

(10) Patent No.: US 7,469,403 B2
(45) Date of Patent: Dec. 23, 2008

(54) STATIC DETECTION OF A DATARACE CONDITION FOR MULTITHREADED OBJECT-ORIENTED APPLICATIONS

(75) Inventors: Jong-Deok Choi, Mt. Kisco, NY (US); Alexey Loginov, Madison, WI (US); Vivek Sarkar, Stamford, CT (US)

(73) Assignee: International Business Machines Corporation, Armonk, NY (US)

( * ) Notice: Subject to any disclaimer, the term of this patent is extended or adjusted under 35 U.S.C. 154(b) by 1105 days.

(21) Appl. No.: 10/032,567

(22) Filed: Jan. 2, 2002

(65) Prior Publication Data

US 2002/0188651 A1     Dec. 12, 2002

(51) Int. Cl.
G06F 9/44    (2006.01)
G06F 9/45    (2006.01)
G06F 11/00   (2006.01)

(52) U.S. Cl. .................. 717/127; 717/131; 717/144; 714/38; 714/48

(58) Field of Classification Search ......... 717/119–132; 718/102, 107; 714/702, 718, 763, 38; 711/147, 711/150, 151; 715/700
See application file for complete search history.

(56) References Cited

U.S. PATENT DOCUMENTS 5,953,530 A * 9/1999 Rishi et al. .................. 717/127
6,009,269 A * 12/1999 Burrows et al. ............. 717/130
6,101,524 A   8/2000 Choi et al.
6,286,130 B1 * 9/2001 Poulsen et al. .............. 717/119
6,343,371 B1 * 1/2002 Flanagan et al. ............ 717/124
6,593,940 B1 * 7/2003 Petersen et al. ............. 715/700

OTHER PUBLICATIONS

John Mellor-Crummey, Compile-time Support for Efficient Data Race Detection in Shared-Memory Parallel Programs, ACM Press 1993, pp. 129-139 (http://portal.acm.org/citation.cfm?id=171370&dl=GUIDE&coll=GUIDE&CFID=31826656&CFTOKEN=65552401).*
Stefan Savage et. al. "A Dynamic Data Race Detector for Multithreaded Programs", ACM Transactions on Computer Systems, vol. 15, No. 4, Nov. 1997, pp. 391-411.
Savage et al. "Eraser: A Dynamic Data Race Detector for Multithreaded Programs", ACM Transactions on Computer Systems, vol. 15, No. 4, Nov. 1997, pp. 391-411.

* cited by examiner

*Primary Examiner*—Chuck Kendall
(74) *Attorney, Agent, or Firm*—Jesse L. Abzug, Esq.; McGinn Ip Law Group, PLLC

(57) ABSTRACT

A static datarace detection method (and apparatus) for multithreaded applications includes inputting a set of input information including a multithreaded context graph (MCG) representation of a multithreaded application, processing the set of input information, and outputting a statement conflict set (SCS). The SCS is a set of statement pairs that may exhibit dataraces. The processing of the set of information includes initializing a synchronization object set for each of a plurality of MCG nodes, performing a nested traversal on the MCG to identify pairs of MCG nodes which are not mutually synchronized, and examining each pair of MCG nodes which are not mutually exclusive to determine if pairs of statements in the nodes represent a datarace by considering objects that can be accessed by the statements.

25 Claims, 2 Drawing Sheets

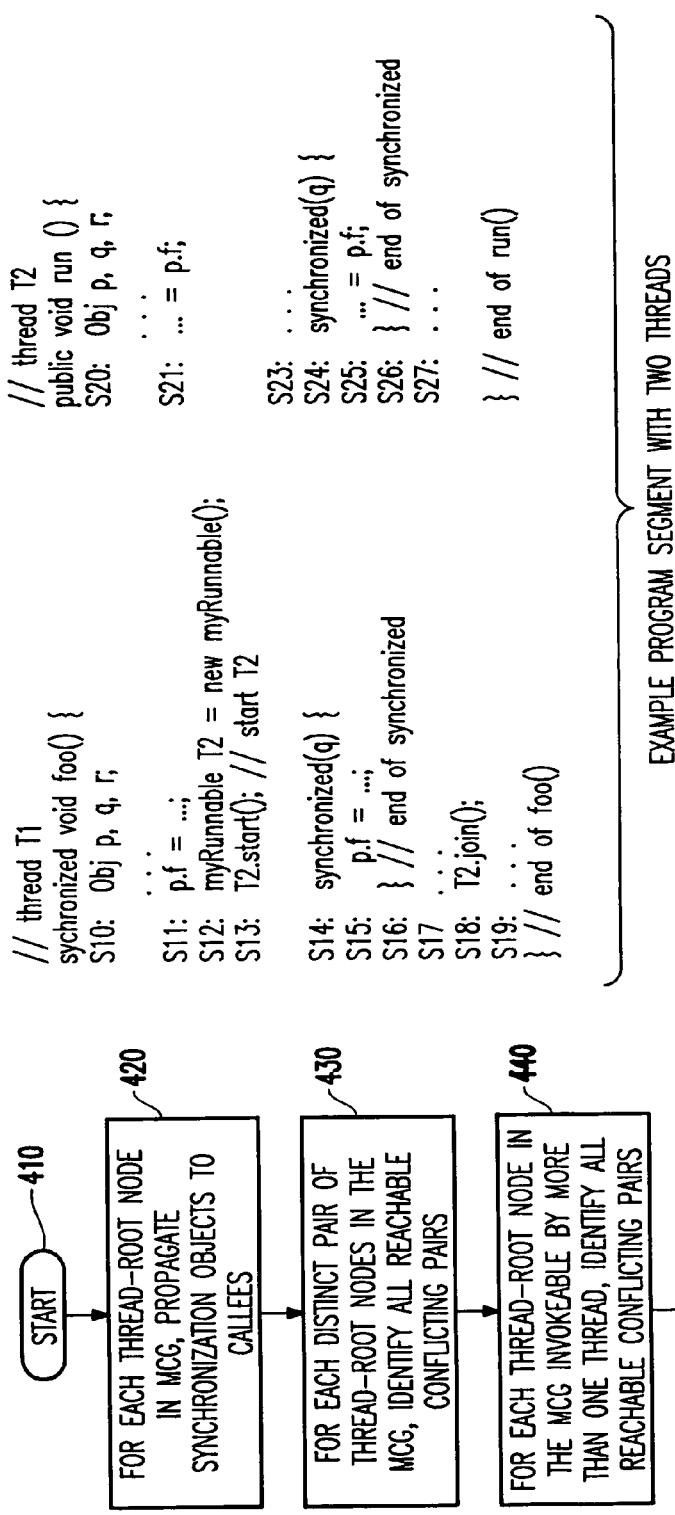

```
// thread T1
sychronized void foo() {
    Obj p, q, r;
S10:
    ...
S11:    p.f = ...;
S12:    myRunnable T2 = new myRunnable();
S13:    T2.start(); // start T2
    ...
S14:    synchronized(q) {
S15:        p.f = ...;
S16:    } // end of synchronized
S17
S18:    T2.join();
S19:    ...
    } // end of foo()
```

```
// thread T2
public void run () {
S20:    Obj p, q, r;
    ...
S21:    ... = p.f;
    ...
S23:    ...
S24:    synchronized(q) {
S25:        ... = p.f;
S26:    } // end of synchronized
S27:    ...
    } // end of run()
```

EXAMPLE PROGRAM SEGMENT WITH TWO THREADS

FIG.6

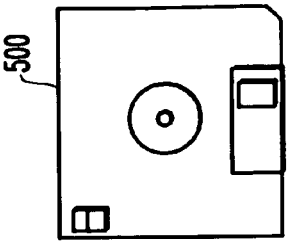

- 410 START
- 420 FOR EACH THREAD-ROOT NODE IN MCG, PROPAGATE SYNCHRONIZATION OBJECTS TO CALLEES
- 430 FOR EACH DISTINCT PAIR OF THREAD-ROOT NODES IN THE MCG, IDENTIFY ALL REACHABLE CONFLICTING PAIRS
- 440 FOR EACH THREAD-ROOT NODE IN THE MCG INVOKEABLE BY MORE THAN ONE THREAD, IDENTIFY ALL REACHABLE CONFLICTING PAIRS
- 450 END

STATIC DETECTION OF A DATARACE CONDITION FOR MULTITHREADED OBJECT-ORIENTED APPLICATIONS

BACKGROUND OF THE INVENTION

1. Field of the Invention

This invention generally relates to a static datarace detection method and apparatus for multithreaded applications, and more specifically to a static datarace detection method and apparatus for detecting definite dataraces and potential dataraces in multithreaded object-oriented applications written in languages such as Java™.

2. Description of the Related Art

Modern operating system platforms support concurrent multiple threads of execution. However, some of these operating system platforms support concurrent multiple threads without complete scheduling control by the user. For example, operating system platforms that support the Java™ (hereinafter "Java") Virtual Machine Specification fall into this category. In such systems, each time a Java application runs, the number of instructions executed by a thread in a time interval allocated to the thread may change due to variations in the state of an external operating system. The apparently random number of instructions executed by threads in a time interval introduces non-deterministic program behavior. On a computer system with multiple processors (hereinafter "multiprocessor system"), interactions of different processors through the underlying hardware system cause unequal execution speed of threads running on different processors, which also causes non-deterministic program behavior. Other events such as windowing events, network events/messages and general input/output operations may also introduce non-deterministic program behavior.

One problem caused by non-deterministic behavior is a datarace. A datarace may occur when accesses of a shared resource by multiple threads may cause one or more threads to compute incorrect results. Typically, a datarace occurs when (a) multiple threads access the same memory location without ordering constraints among the accesses, and (b) at least one of the accesses is a write access. (Under certain circumstances, condition (b) may not be necessary for exhibiting a data race.)

More specifically, there are four necessary conditions for a datarace to exist between two statements: 1) the statements are executed by different threads; 2) the statements access the same memory location, i.e., the same field in the same object; 3) the synchronization objects used in controlling the execution of the first statement do not overlap with those of the second statement; and 4) there is no explicit ordering between the two statements imposed by explicit language constructs in the program such as thread creation and termination. A datarace may occur between execution instances of two statements or between different execution instances of the same statement by different threads.

By way of specific example, FIG. 6 depicts a timing diagram of two methods, named method foo( ) and method run( ). (Only the details of the methods relevant to the datarace example are shown in FIG. 6.) In the example, thread T1 executes method foo( ) (in the left column). When T1 executes statement S13, thread T2 begins executing method run( ) (in the right column). Although statement S15 in method foo( ) is inside a synchronized block starting at S14, statement S21 in method run( ) is not inside any synchronized block (or method). Therefore, there are no constraints on the order in which statements S15 and S21 can execute. Accordingly, whether S15 or S21 executes first may vary from run to run. However, the program can exhibit different behaviors depending on the order in which S15 and S21 execute. For example, when S21 executes after S15, the value that it reads from p.f is the value written by statement S15. Otherwise, it is the earlier value of p.f. Because thread-switching behavior of a program is non-deterministic, so is the manifestation of dataraces at run-time. Also, as dataraces may happen only infrequently, they may be particularly difficult to identify and may not even be noticed during testing and evaluation of a multithreaded application.

Although manual inspection of instructions is a possible approach for identifying data races, it is a time-consuming and error-prone approach. For example, a test program mtrt from the SPECjvm98 benchmark suite contains approximately 8,000 bytecode instructions. This program includes approximately 30 million distinct instruction pairs, but less than 600 of them are potential dataraces. Previous systems for identifying potential dataraces have relied upon either dynamic datarace detection or static type-analysis. Specifically, as described in "Eraser: A Dynamic Data Race Detector For Multithreaded Programs," by Stefan Savage, et al., *ACM Transactions on Computer Systems*, Vol. 15, No. 4, November 1997, Pages 391–411, a tool named Eraser has been developed to dynamically determine the existence of dataraces.

However, dynamic determination of dataraces is resource intensive. With complex programs, the amount of data that a dynamic datarace detection tool must monitor can lead to excessive space and/or time consumption. For example, to perform an exhaustive dynamic datarace detection, every resource must be "instrumented," or watched, to determine whether a datarace is actually occurring during the entire course of an application's execution. Reducing the number of resources monitored during dynamic datarace detection, can reduce the set of dataraces detected.

Further, dynamic datarace analysis detects dataraces that actually occur during an execution of a multithreaded application. The result of dynamic datarace analysis is susceptible to the instrumentation perturbation and also to the variation of input data. Accordingly, conventional systems using dynamic datarace detection fail to enable comprehensive and resource efficient identification of dataraces in complex, multithreaded applications.

Pre-existing static datarace detection methods, such as those based on static type analysis, are quite inaccurate. Specifically, as described in "Type-based race detection for Java," by C. Flanagan and S. N. Freund, *Proceedings of the ACM SIGPLAN Conference on Programming Language Design and Implementation (PLDI)* June 2000, pages 219–232, a tool has been developed to statically determine the existence of dataraces based on static type analysis. A fundamental problem with this tool is that it identifies many "false positives" i.e., identifies dataraces that may never be exhibited in any program execution. Further, programmer annotations are required to improve the effectiveness of the tool.

SUMMARY OF THE INVENTION

In view of the above and other problems of the conventional systems and techniques, it is an object of the present invention to provide a more precise static datarace detection method and apparatus for multithreaded applications than pre-existing ones.

It is another object of the invention to provide a system and method for statically identifying dataraces while using fewer system resources than required by conventional datarace detection systems and methods. Specifically, it is an object of the invention to provide a system and method for statically identifying dataraces while using fewer system resources than required by dynamic datarace detection systems and methods. It is a further object of the invention to provide a system and method for statically identifying dataraces with greater accuracy than conventional datarace detection systems and methods, such as static datarace detection systems and methods based on static type analysis.

In a first aspect of the present invention, a method is provided for statically detecting a datarace in a multithreaded application, the method including inputting a set of input information, processing the set of input information, and outputting a Statement Conflict Set (SCS) that identifies the statements whose execution instances may cause a datarace. The method need not execute the multithreaded application. The input information may include a multithreaded context graph (MCG), wherein the MCG comprises an interprocedural call graph having each of a plurality of synchronized blocks and methods as separate nodes. The multithreaded application may be an application written in an object oriented language, such as Java. The method may further include performing dynamic datarace detection on the outputted SCS. (The availability of an SCS can enable dynamic datarace detection to be performed more efficiently.)

In another embodiment of the present invention, a computer processing system includes an input interface, an output interface, a storage medium comprising an application and meta-information relating to the application, and a processor configured to receive the application and the meta-information, process the application and the meta-information without executing the application, and determine a statement conflict set (SCS) for the application.

In still another embodiment of the present invention, a computer program product includes computer readable medium having computer code embodied therein for statically detecting a datarace in a multithreaded application. The computer readable medium has a computer code embodied therein for statically detecting a datarace in a multithreaded application. The computer program product includes computer readable program code devices configured to receive the application and the meta-information, computer readable program code devices configured to process the application and the meta-information without executing the application, and computer readable program code devices configured to determine a statement conflict set (SCS) for the application.

The present invention detects dataraces by statically analyzing a multithreaded application without executing it. By not executing the application in order to detect dataraces, the present invention has the advantage of not being affected by the instrumentation or the choice of input data, as compared with conventional dynamic datarace detection.

The invention statically detects definite dataraces (i.e., dataraces which will definitely occur in all program executions), and also detects potential dataraces (i.e., dataraces which may occur in some execution instance). The invention identifies four necessary conditions for a datarace to occur between an execution of statement S1 and S2, both involving a memory access: (1) they are performed by different threads; (2) they access the same memory location; (3) the synchronization objects used in controlling the execution of the first statement do not overlap with those of the second statement; and (4) there exists no further timing constraint imposed by the program on the execution of the two statements due to thread creation and termination ordering.

To determine whether these four conditions are met for any two statements in an application, the invention uses two types of alias information: must-alias and may-alias. How to compute must and may alias information is well understood to those of ordinary skill in the art. Specifically, the following documents each describe how to compute may-alias information: "Efficient flow-sensitive interprocedural computation of pointer-induced aliases and side effects," by J.-D. Choi, et al, *Proceedings of the ACM 20th Symposium on Principles of Programming Languages (POPL)* January 1993, pages 232–245; "Pointer-induced aliasing: a problem taxonomy," by W. Landi and B. G. Ryder, *Proceedings of the ACM 18th Symposium on Principles of Programming Languages (POPL)* January 1991, pages 93–103. The following document describes how to compute must-alias information: "An extended form of must alias analysis for dynamic allocation," by R. Altucher and W. Landi, *Proceedings of the ACM 22nd Symposium on Principles of Programming Languages (POPL)* January 1995, pages 74–84.

In addition to using alias information, the invention includes a new algorithm and a new interprocedural program representation, called the multithreaded context graph (MCG), for verifying the first, third and fourth conditions mentioned above. The MCG is similar to the interprocedural call graph (CG), which is a well known program representation from the prior art. In the CG, each node represents a method, and each edge from one method to another represents a callsite in the first method that can potentially invoke the second method.

The invention works by first identifying synchronized methods and blocks (collectively referred to as synchronization nodes) as the principal means to impose timing constraints between executions of different statements. The invention then represents synchronized blocks, as well as synchronized methods, as separate nodes in the MCG. One major difference between CG and MCG is that synchronized blocks and synchronized methods are represented as separate nodes in MCG. For each statement, the invention then identifies the set of objects used as synchronization arguments to synchronize methods and blocks along the MCG paths from the root method of the thread executing the statement to the statement. This set of objects, called the synchronization objects, of each statement is used in determining whether there exists a timing constraint due to synchronization between the executions of two statements: if statements S1 and S2 have no common synchronization objects, there exists no timing constraint due to synchronization between their executions. The invention also exploits additional operations, such as thread creation/termination/rendezvous, to identify additional timing constraints between executions of statements. The MCG has edges for these additional operations.

The invention further includes a framework that identifies a spectrum of dataraces from definite dataraces to potential dataraces, by employing different combinations of must-alias and may-alias information, without changing the mechanisms used to determine whether the aforementioned four conditions are met.

BRIEF DESCRIPTION OF THE DRAWINGS

The foregoing and other objects, aspects and advantages will be better understood from the following detailed description of a preferred embodiment of the invention with reference to the drawings, in which:

FIG. 4 illustrates a flowchart for computing a node conflict set (NCS);

FIG. 5 illustrates a media for storing a computer program product; and

FIG. 6 represents a program segment having two threads.

DETAILED DESCRIPTION OF A PREFERRED EMBODIMENT OF THE INVENTION

Figure 1:
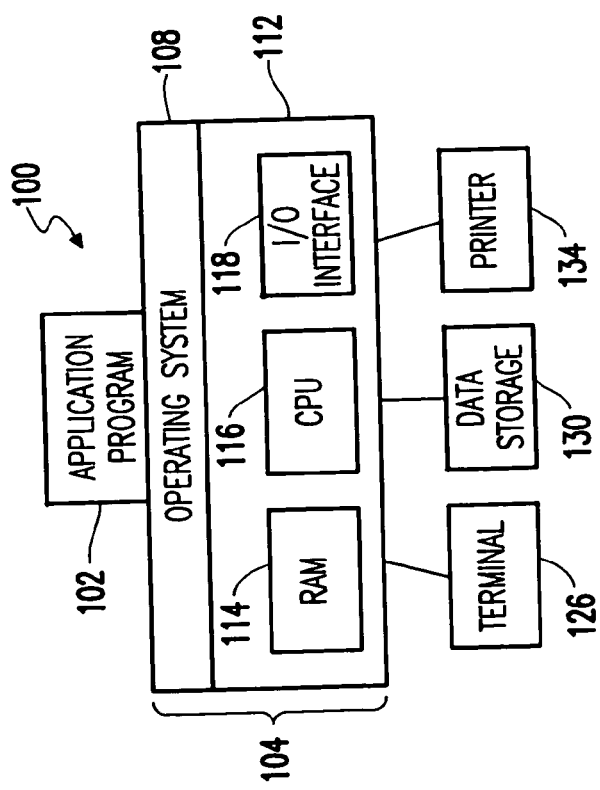
FIG. 1 illustrates an exemplary computer processing system on which the present invention may be implemented.

Referring to FIG. 1, there is shown a block diagram of a computer system 100 on which a preferred embodiment of the present invention operates.

In one embodiment, a system in accordance with the present invention includes an input interface, an output interface, a storage medium comprising the application and meta-information relating to the application, and a processor configured to receive the application and the meta-information, process the application and the meta-information without executing the application, and determine a statement conflict set (SCS) for the application.

As an example, the computer system 100 may include one or more application programs 102 and an operating system 108 that operate on a computer platform 104. The platform 104 includes a hardware unit 112 that includes one or more central processing units (CPUs) 116 (which are typically referred to as CPUs/processors), a random access memory (RAM) 114, and an input/output interface 118.

Various peripheral components may be connected to the computer platform 104 including a terminal 126, a data storage device 130, and a printing device 134. The operating system 108 coordinates the operation of the various components or the computer system 100. An example of computer system 100 is the IBM System/6000® (RISC System/6000® is a trademark of the IBM Corporation). It is readily understood that those skilled in the computer arts will be familiar with many equivalent computer systems to computer system 100.

The operating system 108 of the present invention provides multithreading capabilities wherein multiple concurrent threads of control are dispatched within a single shared address space. Examples include the built-in thread support available within Java Virtual Machines, Microsoft's Windows NT® operating system, and the POSIX threads package that is available on many operating systems, for instance as the package of IBM's AIX® (AIX® is a registered trademark of the IBM Corporation) operating system.

Figure 2:
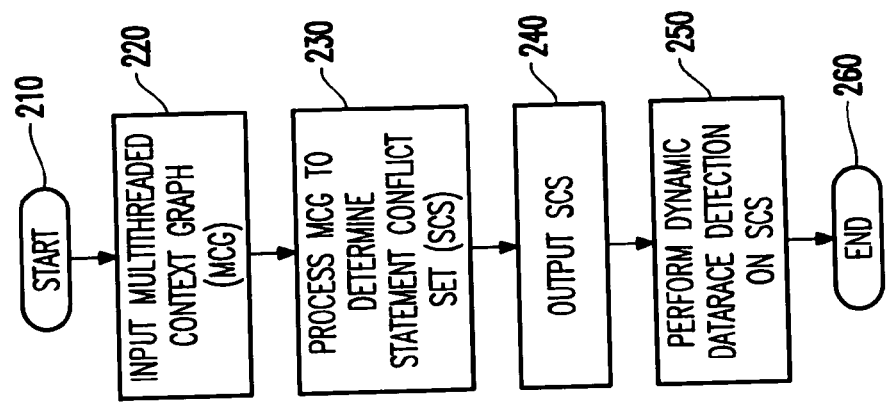
FIG. 2 illustrates a flowchart of the method of statically detecting a datarace in a multithreaded application, with an optional step (250) for using the static analysis results in dynamic datarace detection.

Referring now to FIG. 2, there is a flowchart of the method of statically detecting a datarace in a multithreaded application. The method includes inputting a set of input information 220, processing the set of input information 230, and outputting a statement conflict set 240. Each element of the statement conflict set identifies a datarace that may occur in some execution. The method may additionally include performing dynamic datarace detection 250 by refining the outputted SCS, 240, to a specific execution. Each element of the method is now described in greater detail.

Inputting information 220 may include inputting an MCG. This MCG, as described above, is a CG that additionally represents synchronized blocks, as well as synchronized methods, as separate nodes. The input information may also include the bytecodes that collectively comprise the multithreaded application, such as a Java® application. Additional information may also be input to facilitate the static determination of dataraces.

Figure 3:
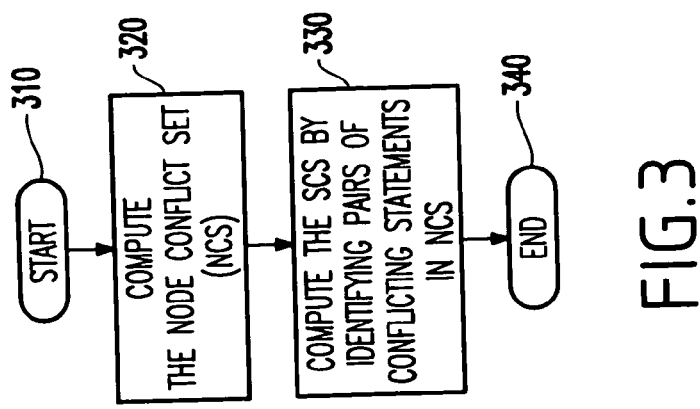
FIG. 3 illustrates a flowchart for processing a multithreaded context graph (MCG) to determine a statement conflict set (SCS)

Processing the MCG to determine a statement conflict set (SCS) 230 is depicted in greater detail in FIG. 3, which includes computing a node conflict set (NCS) and computing the SCS by identifying pairs of conflicting statements in the NCS. FIG. 3 is described in greater detail below.

Outputting the SCS 240 includes outputting the SCS in a human-readable, computer-readable, or other format. For example, outputting the SCS 240 may include displaying the SCS on an output device, such as a display or a printer, as shown in FIG. 1. Additionally, outputting the SCS may include sending the SCS to a communication interface, such as a MODEM interface, or a storage media interface, such as a secondary storage interface.

In one embodiment, the analysis is implemented without executing the corresponding multithreaded application, and stops at step 240. In another embodiment, the method executes the program in step 250, and refines the SCS by performing dynamic datarace detection.

FIG. 3 illustrates a flowchart for processing a multithreaded context graph (MCG) to determine a statement conflict set (SCS). This processing involves computing a node conflict set (NCS) 320 and, from this NCS, computing the SCS by determining pairs of conflicting statements in the NCS 330. Each of the elements of the method is described in greater detail below.

Computing an NCS 320 involves each of the operations depicted in FIG. 4. Specifically, computing an NCS 320 first involves initializing a synchronization object set for each of a plurality of MCG nodes 420. This is done through a forward worklist data-flow analysis operating over the MCG starting at a root node and following intrathread edges of the MCG. The domain of the data-flow fact sets is synchronization objects. Given a node n in the MCG, the synchronization object set at entry to n (SyncObj.n.i) and the synchronization object set at exit from n (SyncObj.n.o) may be defined by the following expressions:

$$\text{SyncObj.n.o} = (\text{SyncObj.n.i}) \cup (\text{n.SyncObj})$$

$$\text{SyncObj.n.i} = \bigwedge_p \text{SyncObj.p.o}, \forall p \in \text{Predecessors}(n),$$

Where the operator $\wedge$ represents set union ($\cup$) for computing definite dataraces, and set intersection ($\cap$) for computing potential dataraces. Also, n.SyncObj is the set of synchronization objects introduced at MCG node n. (The set is non-empty only if node n represents a synchronized method or synchronized block.)

Once the synchronization object sets of each MCG node have been initialized at 420, a traversal of MCG is performed. Specifically, the traversal involves identifying all reachable conflicting node pairs for each distinct pair of thread-root nodes in the MCG 430 and identifying all reachable conflicting node pairs for each thread-root node in the MCG that is invokeable by more than one thread 440. A thread-root node is a node on MCG that corresponds to the statement starting the execution of a thread. In Java, it corresponds to an MCG node corresponding to the run( ) method of a Runnable object such that the node has an interprocedural edge to it from a node corresponding to an invocation of a start( ) method of a Runnable object. A node on MCG is reachable from a thread-root node if there exists a path to it from the thread-root node on MCG. Two nodes n1 and n2 are said to be conflicting nodes if n1 contains an object reference r1 and n2 contains an object reference r2 such that the SameAccessObj(r1, r2) predicate is true. The SameAccessObj(r1, r2) predicate itself is defined as follows:

Let MustAlias(p) and MayAlias(p) be the set of must aliases and the set of may aliases of an object reference p, respectively.

For definite datarace,

SameAccessObj(r1,r2)=(MustAlias(r1)∩MustAlias(r2)).

For potential datarace,

SameAccessObj(r1,r2)=(MayAlias(r1)∩MayAlias(r2)).

The traversal of 430 begins with pairs of distinct thread-root nodes on the MCG, which implies that they must be executed by distinct threads. The traversal at 440 begins with a single thread-root node, and uses the MultipleTheadInstances predicate/relation to determine if the thread-root node can be invoked more than once (as a new thread) in a single application execution. Both 430 and 440 accumulate node-pairs in the NCS. The MultipleTheadInstances predicate for a thread-root node R is defined as follows:

MultipleThreadInstances(R.this)=MustAlias(this)={ }, where R.this is the this pointer of R.

Returning to FIG. 3, after the NCS has been determined, the method proceeds to computing the SCS by identifying pairs of conflicting statements in the NCS 330. More particularly, for each pair of MCG nodes in the NCS, the object references within each node are examined to determine whether they represent a datarace or not by using the Same-AccessObj relation. Escape analysis is employed to compensate for imprecision of alias analysis. Escape analysis checks if an object may be visible to more than one thread (this can happen if the object's reference is saved in a static field or in a field of an object that implements the Runnable interface). Then, even if alias analysis results suggest that the same object may be accessed in two statements executable by different threads, the two statements should not be added to the SCS if the object does not escape its creating thread.

One technique of determining whether a pair of MCG nodes from the NCS belongs in the SCS is to first check that the accesses are to the same location in the object (e.g., same field of a non-array object). If they are, there is a potential datarace. However, if two accesses to fields of the synchronization arguments (the this reference in a synchronized method, or the argument of the synchronized statement which opens a synchronized block) are made, there is no datarace. By eliminating nodes wherein the two accesses are to fields of the synchronization arguments, the present invention is able to improve the precision of datarace analysis when testing accesses to synchronization objects.

In a preferred embodiment, potential dataraces are detected using the following precise definitions of various types of aliasing between a reference expression and an object. For a given reference variable p and statement S, a reference expression p(S) denotes a set of values that p holds at statement S. Must and may alias information may be determined by any conventional method, including methods developed in the future.

Regarding the thread objects, an object has a must-alias thread object if it has a single thread object that is a must-alias object, and an object has a may-alias thread object if it has a single thread object that is a may-alias object or a must-alias object. The following predicates are used to define DefSameThreadObj and PossSameThreadObj:

(1)  DefSameThreadObj(p(S.i),q(S.j)) =
     (MustThreadObj(p(S.i)) ∩ MustThreadObj(p(S.j))) ≠ { }
(2)  PossSameThreadObj(p(S.i),q(S.j)) =
     (MayThreadObj(p(S.i)) ∩ MayThreadObj(p(S.j))) ≠ { }

The access objects of a reference expression are the alias objects of the reference expression. They represent the set of dynamic objects any one of which might be accessed at time of execution. MustAccessObjects(p(S)) and MayAccessObjects(p(S)) denote the set of must-alias objects and may-alias objects of p(S), respectively. The following predicates are used to define DefSameAccessObj and PossSameAccessObj:

(3)  DefSameAccessObj(p(S.i),q(S.j)) = (MustAccessObj(p(S.i))
     ∩ MustAccessObj(p(S.j)) ≠ { } )
     ∧ (p(S.i) and q(S.j) access the same field)
     ∧ (p(S.i) or q(S.j) is a write)
(4)  PossDefSameAccessObj(p(S.i),q(S.j)) = (MayAccessObj(p(S.i))
     ∩ MayAccessObj(p(S.j)) ≠ { } )
     ∧ (p(S.i) and q(S.j) access the same field)
     ∧ (p(S.i) or q(S.j) is a write)

As described above, under some memory models, a read-read pair may also cause a datarace. Accordingly, the last condition of the above two predicates may be eliminated or modified to suit a particular memory model.

The synchronization objects of two statements allow the determination of whether two statements (or two executions of a single statement) executed by two different threads are synchronized with respect to each other via the synchronization objects (e.g., of synchronized methods and synchronized blocks). If two expressions always execute within a lifetime of a synchronized method or block invoked on the same must-alias object, then the expressions are definitely synchronized. Similarly, if two expressions may execute within a lifetime of a synchronized method or block invoked on the same may-alias object, then the expressions may be synchronized. The two situations are used to define predicates DefSync and PossSync, respectively.

Additionally, the expression DefExecutionStmt(S) is true if and only if the execution statement S must execute.

Potential dataraces are detected by using an IsPotentialDR relation and definite dataraces are detected by using an IsDefiniteDR relation. The IsPotentialDR relation is preferably defined as:

(5)  IsPotentialDR(p(S.i), q(S.j)) =
(6)      ¬ (DefSameThreadObj(p(S.i), q(S.j)))
(7)      ∧ (PossSameAccessObj(p(S.i), q(S.j)))
(8)      ∧ ¬ (DefSync(p(S.i), q(S.j)))

The IsDefiniteDR relation is preferably defined as:

(9)   IsDefiniteDR(p(S.i), q(S.j)) =
(10)      ¬ (PossSameThreadObj(p(S.i), q(S.j)))
(11)      ∧ (DefSameAccessObj(p(S.i), q(S.j)))
(12)      ∧ ¬ (PossSync(p(S.i), q(S.j)))

-continued

| (13) | $\wedge$ (DefExecutionStmt(S.i)) |
| (14) | $\wedge$ (DefExecutionStmt(S.j)) |

In each of these relations, ¬ represents the negation of an expression and $\wedge$ represents the conjunction of an expression. Accordingly, regarding the IsPotentialDR, equation (6) states that the two reference expressions might be executed by different threads (negation of DefSameThreadObj), Equation (7) states that the two reference expressions might access the same field of the same object, and Equation (8) states that the two reference expressions might not be mutually synchronized (negation of DefSync).

Further, regarding the IsDefiniteDR, Equation (10) states that the two reference expressions cannot be executed by the same thread (negation of PossSameThreadObj), Equation (11) states that the two reference expressions must access the same field of the same object, and Equation (12) states that the two reference expressions cannot be mutually synchronized (negation of PossSync). Additionally, IsDefiniteDR further determines whether each of the statements must execute using Equations (13) and (14).

Between the extremes of definite and potential datarace analysis, a number of intermediate methodologies of analysis are also possible. For example, a plausible datarace may be defined as:

$$\begin{aligned}\text{IsPlausibleDR}(p(S.i), q(S.j)) = \\ \neg\ (\text{DefSameThreadObj}(p(S.i), q(S.j))) \\ \wedge\ (\text{DefSameAccessObj}(p(S.i), q(S.j))) \\ \wedge\ \neg\ \text{PossSync}(p(S.i), q(S.j)))\end{aligned}$$

Other types of relations are possible based on the input information available, the degree of certainty in detecting a datarace required, and other factors.

FIG. 5 illustrates a computer program product, including computer readable medium 500 having computer code embodied therein for statically detecting a datarace in a multithreaded application. The computer program product includes computer readable program code devices configured to receive the application and the meta-information, computer readable program code devices configured to process the application and the meta-information without executing the application, and computer readable program code devices configured to determine a statement conflict set (SCS) for the application.

As an example, this method may be implemented in the particular hardware environment discussed above with regard to FIG. 1. Such a method may be implemented, for example, by operating the CPU 116 (FIG. 1), to execute a sequence of machine-readable instructions. These instructions may reside in various types of storage media.

Thus, this aspect of the present invention is directed to a programmed product, comprising storage media tangibly embodying a program of machine-readable instructions executable by a digital data processor incorporating the CPU 2 and hardware above, to perform a method detecting dataraces in multithreaded object-oriented programs.

This signal-bearing media may include, for example, RAM 114 contained externally or within the CPU 116, as represented by fast-access storage for example. Alternatively, the instructions may be contained in another signal-bearing media, such as data storage 130 (FIG. 1) or a magnetic data storage diskette 500 (FIG. 5), directly or indirectly accessible by the CPU 116.

Whether contained in the diskette 500, the computer 100, or elsewhere, the instructions may be stored on a variety of computer readable medium having computer code embodied therein for statically detecting a datarace in a multithreaded application, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards. In an illustrative embodiment of the invention, the machine-readable instructions may comprise bytecodes corresponding to a multithreaded Java application, software object code compiled from a language such as "C", etc.

In one embodiment of the present invention, static datarace detection is used in conjunction with dynamic datarace detection. For example, given a program that has a predetermined number of statements, static datarace detection is used to identify a first datarace set comprising statements that may be dataraces, dynamic datarace detection is then used to identify a third number of statements that actually cause dataraces on a set of executions.

While the invention has been described in terms of a preferred embodiment, those skilled in the art will recognize that the invention can be practiced with modification within the spirit and scope of the appended claims.

What is claimed is:

1. A method for statically detecting a datarace condition in a multithreaded application, said method comprising:
   inputting a set of input information comprising a multithreaded context graph;
   processing the set of input information by comparing threads that may execute statements in a statement pair, said processing comprising computing a node conflict set by traversing said multithreaded context graph to identify conflicting pairs of nodes in said multithreaded context graph; and
   outputting a statement conflict-set that identifies the statement pairs in said node conflict set having execution instances which definitely or potentially cause dataraces, such that a datarace condition is statically detected without executing the multithreaded application.

2. The method of claim 1, wherein the processing comprises:
   selectively evaluating the input information with an IsPotentialDR relation for detecting potential dataraces; and
   selectively evaluating the input information with an IsDefiniteDR relation for detecting definite dataraces.

3. The method of claim 2, wherein, for a given pair of reference expressions, the IsPotentialDR relation comprises:
   determining whether the reference expressions might be executed by different threads (negation of DefSameThreadObj);
   determining whether the reference expressions might access the same field of the same object; and
   determining whether the reference expressions might not be mutually synchronized (negation of DefSync).

4. The method of claim 2, wherein, for a given pair of reference expressions, the IsDefiniteDR relation comprises:
   determining whether the reference expressions cannot be executed by the same thread (negation of PossSameThreadObj);
   determining whether the reference expressions must access the same field of the same object;

determining whether the reference expressions cannot be mutually synchronized (negation of PossSync); and determining whether the reference expressions must execute.

5. The method of claim 1, wherein the set of input information comprises at least one multithreaded context graph.

6. The method of claim 5, wherein the at least one multithreaded context graph comprises an interprocedural call graph having each of a plurality of synchronized blocks as a separate node.

7. The method of claim 5, wherein the at least one multithreaded context graph comprises an interprocedural call graph having each of a plurality of synchronized methods as a separate node.

8. The method of claim 1, further comprising:

performing dynamic datarace detection on the Statement Conflict Set.

9. The method of claim 8, wherein said performing said dynamic datarace detection is performed after said outputting said statement conflict set.

10. The method of claim 1, further comprising:

performing escape analysis to identify statements that can access memory locations accessible by more than one thread.

11. The method of claim 1, wherein said multithreaded context graph represents synchronized blocks and methods as separate nodes.

12. The method of claim 11, wherein said computing the node conflict set comprises:

initializing a synchronization object set for each of a plurality of multithreaded context graph nodes.

13. The method of claim 12, wherein said computing the node conflict set further comprises:

identifying all reachable conflicting node pairs for each thread-root node.

14. The method of claim 13, wherein said computing the node conflict set further comprises:

identifying all reachable conflicting node pairs for each distinct pair of thread-root nodes in the at least one multithreaded context graph; and identifying all reachable conflicting node pairs for each thread-root node in the at least one multithreaded context graph that is invokeable by more than one thread.

15. The method of claim 1, wherein the input comprises meta-information relating to said multithreaded application which is written in an object-oriented programming language.

16. The method of claim 1, wherein the input comprises a multithreaded context graph (MCG) for said multithreaded application which is written in an object-oriented programming language.

17. The method of claim 16, wherein the input further comprises a plurality of bytecodes that collectively comprise the application.

18. The method of claim 1, wherein said comparing said threads comprises:

tagging a statement with a set of threads that may execute said statement, and comparing sets of threads for said statements.

19. The method of claim 1, wherein said comparing said threads comprises:

comparing sets of locks held by threads that may execute said statements.

20. The method of claim 1, wherein said outputting said statement conflict set comprises outputting said statement conflict set to at least one of a display device, a printer, a communication interface and a storage media interface.

21. A computer processing system for statically detecting a datarace condition in a multithreaded application, comprising:

an input interface;

an output interface;

a storage medium comprising the application and meta-information relating to the application, said meta-information comprising a multithreaded context graph; and a processor configured to receive the application and the meta-information, process the application and the mete-information without executing the application, and determine a statement conflict set (SCS) for the application, such that a datarace condition is statically detected, wherein said processor compares threads that may execute statements in a statement pair, and computes a node conflict set by traversing said multithreaded context graph to identify conflicting pairs of nodes in said multithreaded context graph.

22. The computer processing system of claim 21, wherein said multi-threaded context graph represents synchronized blocks and methods as separate nodes.

23. The computer processing system of claim 21, wherein, the processor is further configured to perform dynamic datarace detection on the SCS.

24. A computer program product, comprising a computer readable medium having computer code embodied therein for statically detecting a datarace condition in a multithreaded application, said computer program product comprising:

computer readable program code devices configured to receive the application and the meta-information comprising a multithreaded context graph;

computer readable program code devices configured to process the application and the meta-information by computing a node conflict set by traversing said multithreaded context graph to identify conflicting pairs of nodes in said multithreaded context graph, such that a datarace condition is statically detected without executing the application; and computer readable program code devices configured to determine a statement conflict set (SCS) for the application by comparing threads that may execute statements in a statement pair.

25. A method for statically detecting a datarace condition in a multithreaded application, said method comprising:

inputting a set of input information;

processing the set of input information by comparing threads that may execute statements in a statement pair;

outputting a statement conflict set that identifies the statement pairs having execution instances which definitely or potentially cause dataraces, such that a datarace condition is statically detected without executing the multithreaded application;

performing dynamic datarace detection on the Statement Conflict Set; and performing escape analysis to identify statements that can access memory locations accessible by more than one thread, wherein said processing comprises:

computing a node conflict set; and computing the Statement Conflict Set by determining pairs of conflicting statements in the node conflict set, wherein said computing the node conflict set comprises:
  initializing a synchronization object set for each node in a multithreaded context graph (MCG);
  identifying all reachable conflicting node pairs for each thread-root node;
  identifying all reachable conflicting node pairs for each distinct pair of thread-root nodes in the multithreaded context graphs; and
  identifying all reachable conflicting node pairs for each thread-root node in the multithreaded context graphs that is invokeable by more than one thread, and
wherein the input comprises said multithreaded context graph (MCG) for said multithreaded application which is written in an object-oriented programming language.

* * * * *